(12) United States Patent
Wilson

(10) Patent No.: US 8,953,772 B2
(45) Date of Patent: Feb. 10, 2015

(54) AGENT CONFERENCED IVR

(75) Inventor: Craig Wilson, Orangeville (CA)

(73) Assignee: Avaya Inc., Basking Ridge, NJ (US)

( * ) Notice: Subject to any disclaimer, the term of this patent is extended or adjusted under 35 U.S.C. 154(b) by 166 days.

(21) Appl. No.: 13/411,947

(22) Filed: Mar. 5, 2012

(65) Prior Publication Data

US 2013/0230154 A1 Sep. 5, 2013

(51) Int. Cl.
*H04M 3/00* (2006.01)
*H04M 3/42* (2006.01)

(52) U.S. Cl.
USPC ............................. 379/265.01; 379/202.01

(58) Field of Classification Search
USPC .................... 379/76, 88.18, 202.01
See application file for complete search history.

(56) References Cited

U.S. PATENT DOCUMENTS

| | | | |
|---|---|---|---|
| 6,366,879 B1 * | 4/2002 | Coxhead et al. ............. 704/201 |
| 6,823,054 B1 * | 11/2004 | Suhm et al. .................. 379/134 |
| 6,831,966 B1 * | 12/2004 | Tegan et al. ................. 379/88.16 |
| 6,922,466 B1 * | 7/2005 | Peterson et al. ............ 379/88.09 |
| 6,970,554 B1 * | 11/2005 | Peterson et al. ............ 379/266.1 |
| 7,693,274 B2 * | 4/2010 | Eppel et al. ............... 379/265.01 |
| 7,801,111 B2 * | 9/2010 | Coussement ................ 370/352 |
| 7,830,792 B1 * | 11/2010 | Khuc et al. .................... 370/230 |
| 8,010,365 B1 * | 8/2011 | Collins et al. .............. 704/270.1 |
| 8,233,613 B1 * | 7/2012 | Michaelis et al. ............ 379/422 |
| 2006/0256950 A1 * | 11/2006 | Patel et al. ............... 379/265.02 |

\* cited by examiner

*Primary Examiner* — Joseph T Phan
(74) *Attorney, Agent, or Firm* — Sheridan Ross P.C.

(57) ABSTRACT

A system engages a live agent in a multi-party call type arrangement with the user and an Interactive Voice Response (IVR) unit when the user has difficulty with the IVR. The agent is provided with information about the IVR process being executed and the user's input. When the agent is introduced into the call, the agent does not take over the IVR session, but the agent helps direct the user to provide the correct input(s) to the IVR session. Once the issue is corrected, the agent can remove themself from the customer/IVR dialog. As a consequence: the user continues their self-service transactions in the IVR, and the user is better educated on how to navigate the IVR in the future. Further, agent resources are spared from further interaction with the user, and the user is less likely to have a negative opinion of the IVR.

20 Claims, 7 Drawing Sheets

AGENT CONFERENCED IVR

BACKGROUND

Building highly effective customer service applications, in an interactive voice response (IVR) system, is complex and expensive. The value of these investments is reduced when users fail to negotiate the IVR prompts correctly, ultimately having their transaction needs met by a call center agent. When the customer is served by an agent three things occur. First, the customer is not taught how to overcome the error generated in the IVR, so they are prone to invoke the more costly agent processing of their request in a subsequent transaction. Second, the customer's preference for agent supported transactions is rewarded, hence discouraging continued use of the IVR. And third, the agent serving the IVR can be occupied with completing all of the transactions needed by the customer on that interaction with the enterprise, thus, increasing operational expenses for the center.

Currently, when users experience problems using an IVR there are three solutions. First, the most commonly applied solution is to have the call transferred to an agent, and the agent handles all the transactions associated with that call for the customer. In this model, the IVR is abandoned for the transaction where the customer is forced out or presses zero (0) to exit the IVR. Second and less frequently, an agent takes the customer's call following the failed use of the IVR and completes the transaction with which the customer struggled. If the customer has multiple transactions to complete in that call, the agent generally transfers the customer back into the IVR to complete the subsequent transactions. Finally, the least frequent occurring solution is categorized as "Agent Assisted IVR." In this method, dedicated call center agents are concurrently listening to multiple customer interactions within the IVRs. The customer is not aware that their interaction within the IVR is being monitored. When the customer experiences a problem, the agent tries to intervene by advancing the IVR script on the caller's behalf. This method has limited application. This method provides some opportunity to improve customer IVR usage. For example, the agent responds for a customer with a heavy accent that cannot be recognized by the IVR's speech engine. The heavy accent is, however, discernible by the monitoring agent, and the agent can "push" the call along to the appropriate next menu step, without interacting with the customer. However, this type of agent assistance is limited in its application. For example, if the customer cannot input their account number, the monitoring agent cannot correct the account number.

Typical solutions today do nothing to encourage or train the customer on how to use the IVR. These present methods do not change the likelihood that a customer will engage a more expensive call center agent when exiting IVR functions. The current solutions create five problems: (1) restarting interactions after the customer abandoned their progress in the IVR; (2) impeding the uptake of the IVR for service delivery (the customer continues to prefer to use a human agent); (3) preventing the customer from learning the IVR system; dissuading organizations from placing more complicated applications on the IVR system because complicated functions have higher user error rates; and (5) propagating the perception that IVR systems are poor service delivery mechanisms.

SUMMARY

It is with respect to the above issues and other problems that the embodiments presented herein were contemplated. A system is provided to conference a customer with the agent and the IVR system. The system can automatically monitor the customer's interaction with the IVR system. If needed, the system can automatically identify that the customer is having difficulties with the IVR script executed by the IVR system. In response, the system can then engage an agent, the IVR system, and the customer in a conference. The agent can direct responses to the IVR script. Rather than completing the interactions for the customer, the agent can instruct the customer on how to answer or interact with the IVR system.

The solution engages a live agent in a multi-party call type arrangement with the user and the IVR when the user makes an error in the IVR. The agent is provided with information about the IVR process being executed and the user's input. When the agent is introduced into the call, the agent does not take over the transaction, rather, the agent helps direct the user to provide the correct input to the IVR prompt. Once the issue is corrected, the agent can remove themselves from the customer/IVR dialogue. As a consequence: the user continues their self-service transactions in the IVR, and the user is better educated on how to navigate the IVR in the future. Further, agent resources are spared from supporting subsequent transactions within the same interaction with the user, and the user is less likely to have a negative opinion of the IVR so subsequent reuse is more probable.

The system and method has several advantages. The user is not diverted away from the IVR to be served by a call center agent. Rather, the agent is brought into the IVR dialogue for a very limited period of time to assist the user with the IVR dialogue. After the service is delivered, the agent is released and the user remains engaged with the IVR to complete the transaction. Progressively, customers will learn how to avoid IVR interaction errors and become more self-sufficient—reducing the resources needed to help customer complete IVR supported transactions.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the embodiments are considered to include a tangible storage medium and prior art-recognized equivalents and successor media, in which the software implementations are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element.

While exemplary embodiments are described, it should be appreciated that individual aspects can be separately claimed.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
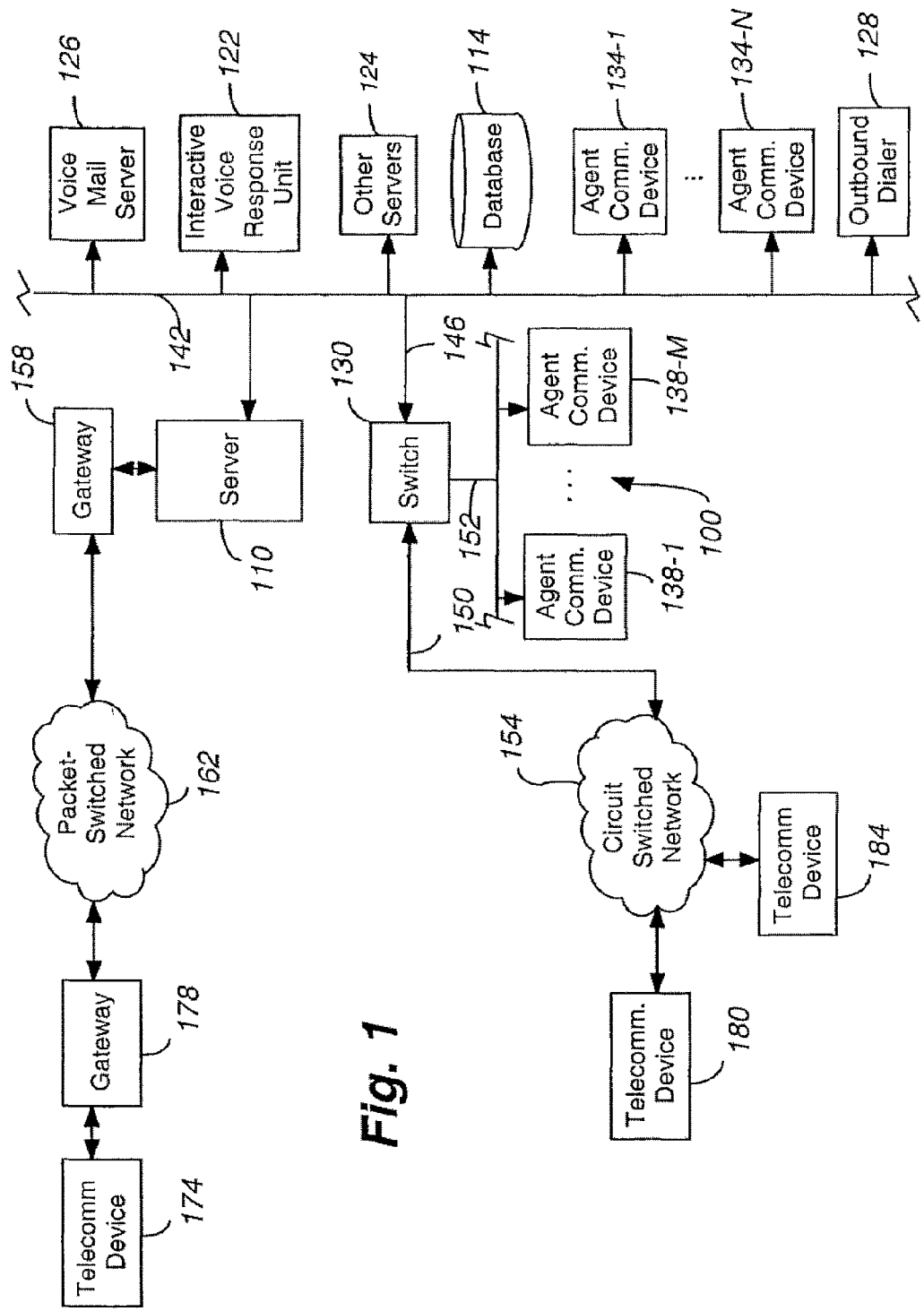
FIG. 1 is a block diagram of an embodiment of a contact center.

FIG. 1 shows an illustrative embodiment of a contact center 100. A contact center 100 comprises a central server 110, a set of data stores or databases 114 containing contact or customer related information and other information that can enhance the value and efficiency of the contact, and a plurality of servers, namely a voice mail server 126, an Interactive Voice Response unit or IVR 122, and other servers 124, an outbound dialer 128, a switch 130, a plurality of working agents operating packet-switched (first) telecommunication devices 134-1 to 134-N (such as computer work stations or personal computers), and/or circuit-switched (second) telecommunication devices 138-1 to 138-M, all interconnected by a local area network LAN (or wide area network WAN) 142. The servers can be connected via optional communication lines 146 to the switch 130. As will be appreciated, the other servers 124 can also include a scanner (which is normally not connected to the switch 130 or Web server), VoIP software, video call software, voice messaging software, an IP voice server, a fax server, a web server, an instant messaging server, and an email server) and the like. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and the packet-switched network 162 to process communications passing between the server 110 and the network 162.

Figure 2:
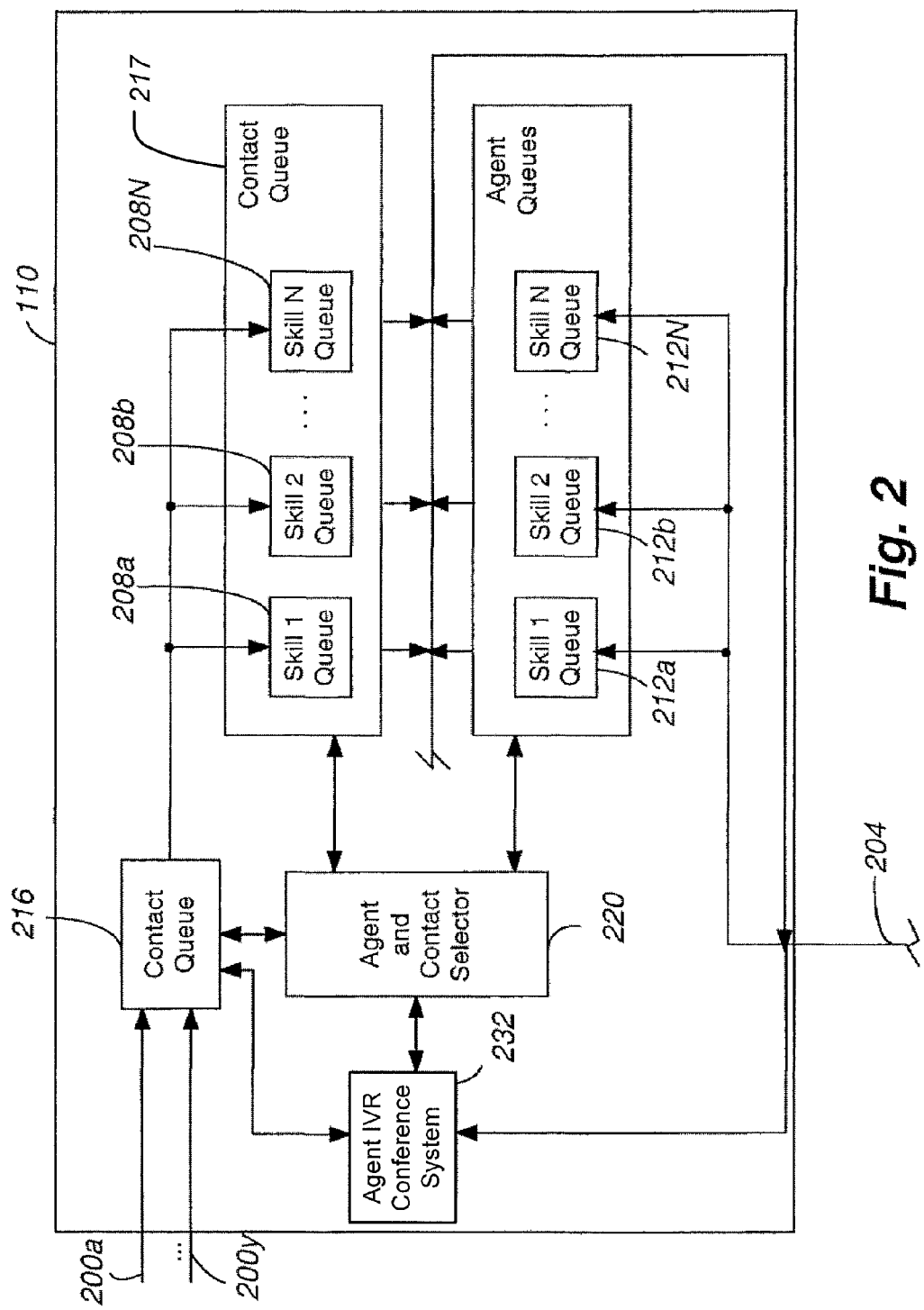
FIG. 2 is a block diagram of an embodiment of a contact center server.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line 146). The server 110 can include a Basic Call Management System or BCMS (not shown) and a Call Management System or CMS (not shown) that gathers call records and contact-center statistics for use in generating contact-center reports.

The switch 130 and/or server 110 can be any architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference in their entirety for all that they teach; Avaya Inc.'s Definity™ Private-Branch Exchange (PBX)-based ACD system; MultiVantage™ PBX, CRM Central 2000 Server™, Communication Manager™, Business Advocate™, Call Center™, Contact Center Express™, Interaction Center™, and/or S8300™, S8400™, S8500™, and S8700™ servers; or Nortel's Business Communications Manager Intelligent Contact Center™, Contact Center—Express™, Contact Center Manager Server™, Contact Center Portfolio™, and Messaging 100/150 Basic Contact Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

Referring again to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and are queued in individual ones of the contact queues 208a-n in their respective orders of priority or are queued in different ones of a plurality of contact queues that correspond to a different priority. Likewise, each agent's skills are prioritized according to his or her level of expertise in that skill, and either agents are queued in individual ones of agent queues 212a-n in their order of expertise level or are queued in different ones of a plurality of agent queues 212a-n that correspond to a skill and each one of which corresponds to a different expertise level.

Included among the control programs in the server 110 is an agent and contact selector 220 (referred to hereinafter simply as the contact selector 220). Contacts incoming to the contact center, which are temporarily held in contact queue 216, are assigned by contact selector 220 to different contact queues 208a-n based upon a number of predetermined criteria, including customer identity, customer needs, contact center needs, current contact center queue lengths, customer value, and the agent skill that is required for the proper handling of the contact. The queues 208a-n are part of a larger contact queue 217. The predetermined criteria may be obtained by either automatic or initial human interaction to determine the needs of the customer. These criteria can be used to initially evaluate whether the customer is having difficulty with an IVR script and conference the customer with an agent as described in conjunction with FIGS. 3 through 5.

Agents who are available for handling contacts are assigned to agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in DEFINITY Communications System Generic 3 Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring again to FIG. 1, the gateway 158 can be Avaya Inc.'s, G250™, G350™ G430™, G450™, G650™, G700™, and IG550™ Media Gateways and may be implemented as hardware such as via an adjunct processor (as shown) or as a chip in the server. The first telecommunication devices 134-1, . . . 134-N are packet-switched and can include, for example, IP hardphones such as the Avaya Inc.'s, 1600™, 4600™, and 5600™ Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming calls to and receive outgoing calls from these extensions in a conventional manner. The second telecommunication devices can include, for example, wired and wireless telephones, PDAs, H.320 video phones and conferencing units, voice messaging and response units, and traditional computer telephony adjuncts. Exemplary digital telecommunication devices include Avaya Inc.'s 2400™, 5400™, and 9600™ Series phones.

It should be noted that the embodiments do not require any particular type of information transport medium between the switch or the server and the first and the second telecommunication devices, i.e., the embodiments may be implemented with any desired type of transport medium as well as combinations of different types of transport media. The packet-switched network 162 can be any data and/or distributed processing network, such as the Internet. The network 162 typically includes proxies (not shown), registrars (not shown), and routers (not shown) for managing packet flows.

The packet-switched network 162 is in (wireless or wired) communication with an external first telecommunication device 174 via a gateway 178, and the circuit-switched network 154 with an external (wired) second telecommunication device 180 and (wireless) third (customer) telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In some configurations, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk. It should be emphasized that the configuration of the switch, server, user telecommunication devices, and other elements as shown in FIG. 1 is for purposes of illustration only and should not be construed as limiting the embodiments to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 126, the instant messaging server, and/or first or second telecommunication device 134, 138 associated with a selected agent. The server 110 distributes and connects these contacts to telecommunication devices of available agents based on the predetermined criteria noted above. When the central server 110 forwards a voice contact to an agent, the central server 110 also forwards customer-related information from databases 114 to the agent's computer work station for viewing (such as by a pop-up display) to permit the agent to better serve the customer. The agents process the contacts sent to them by the central server 110. This embodiment is suited for a Customer Relationship Management (CRM) environment in which customers are permitted to use any media to contact a business. In a CRM environment, both real-time and non-real-time contacts must be handled and distributed with equal efficiency and effectiveness.

In embodiments, included among the programs executing on the server 110 are an agent and contact selector 220 and agent IVR conference module 232. The selector 220 and agent IVR conference module 232 are stored either in the main memory or in a peripheral memory (e.g., disk, CD ROM, etc.) or some other computer-readable medium of the center 100. The contact selector 220 and agent IVR conference module 232 collectively effect an assignment between available contacts in a queue and available agents serving the queue in a way that tends to maximize contact center efficiency. The selector 220 uses predefined criteria in selecting an appropriate agent to service the contact. The agent IVR conference module 232 assigns services priorities to contacts and, as part of this function, identifies contacts as disconnected or transitory contacts and determines whether such contacts merit special treatment. The agent IVR conference module 232 provides instructions to the selector 220 to effect the special treatment.

The agent IVR conference module 232, based on one or more selected criteria, determines whether a contact should be placed in a conference with an agent to assist with an IVR. Special treatment includes providing the agent with materials or information to assist the customer, determine when and if the contact needs to have an agent assigned, etc. These and other embodiments are described in conjunction with FIG. 3.

Figure 3:
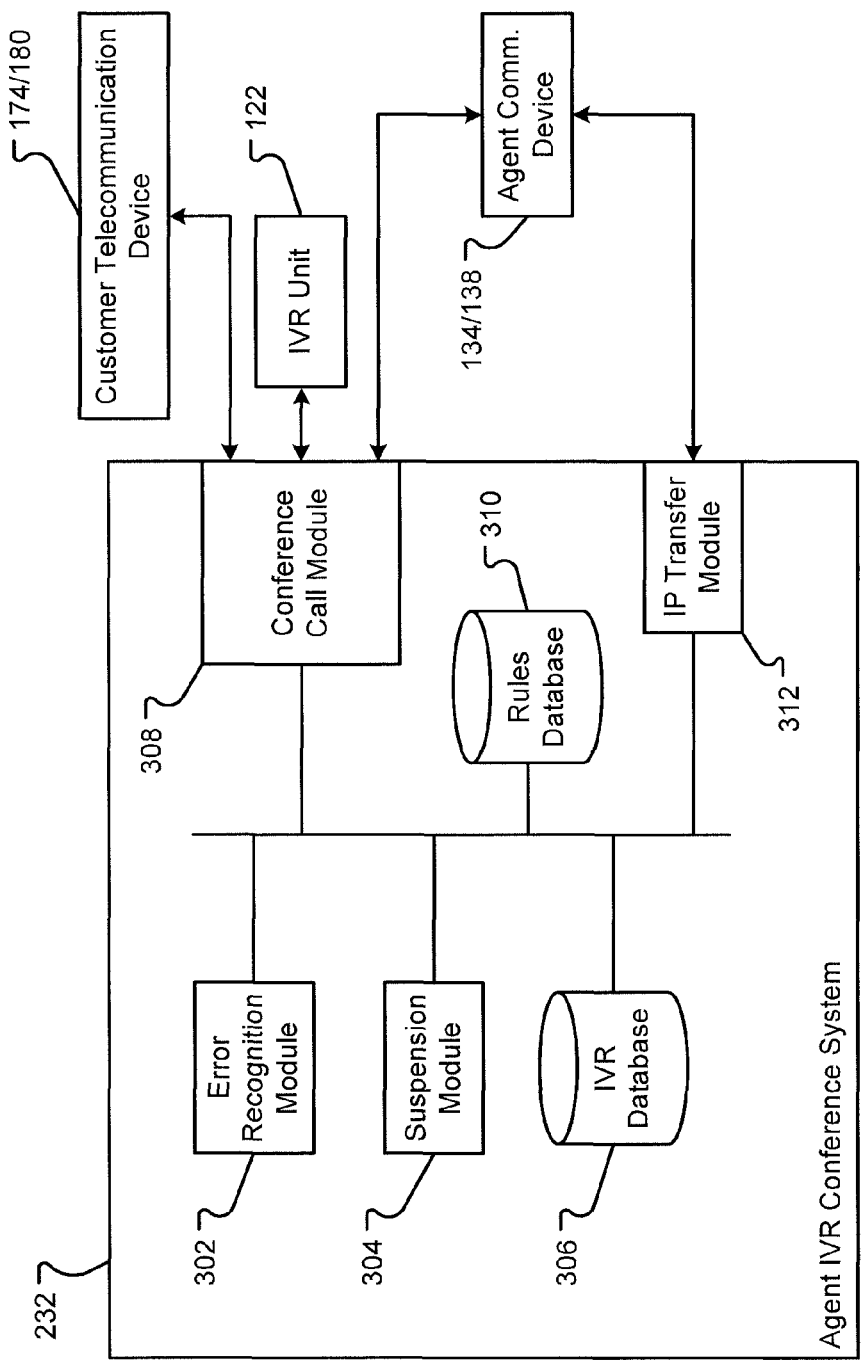
FIG. 3 is another block diagram of an embodiment of a contact center server including a caller evaluation system.

An embodiment of the central server 110 (referred to as "server") in the contact center 100, which includes an agent IVR conference module 232, is shown in FIG. 3. Generally, the agent IVR conference module 232 of the central server 110, which may be a computer system as described in conjunction with FIGS. 6 and 7, includes one or more software modules, components, etc. that are operable to assist callers with an IVR. However, in embodiments, the modules, components, etc. described in conjunction with FIG. 3 are embodied in specially designed hardware, such as a application specific integrated circuit (ASIC) or field programmable gate array (FPGA). However, the central server 110 is hereinafter described as a computer system executing software to provide the functionality, but the embodiments are not limited to these examples as one skilled in the art will understand.

An agent IVR conference system 232 is operable to communicate with a contact, an agent, a contact selector 220, one or more skill queues 212/208, and/or the interactive voice response unit 122. The agent IVR conference system 232 is operable to monitor one or more customer contacts, which may have been placed in the contact queue 216 and then forwarded to or are using the interactive voice response unit 122. The agent IVR conference system 232 can determine if the customer is having difficulty with the IVR script and may then either direct the contact selector 220 to route the contact into a conference that should include an IVR skilled agent in an agent queue 212 or simply send the contact to an agent. In other embodiments, the IVR script has the ability to direct a contact to an agent or conference with an agent. Thus, the customer is placed into a contact queue 217 and a skill queue 208 associated with IVR assistance. The agent is queued in the agent queue 212, and the IVR system 122 may also be conferenced into the call. An embodiment of the IVR conference system 232 is as shown in FIG. 3.

Referring to FIG. 3, an agent IVR conference system 232 may be a module or system operated by a server or processor. The agent IVR conference system 232 can include one or more modules that may be executed in hardware or software. These modules may communicate with one another to conduct the operations described herein. In embodiments, the agent IVR conference system 232 includes an error recognition module 302, a suspension module 304, an IVR database 306, a conference call module 308, a second database 310 and/or an IP transfer module 312. Each of these modules will be described herein after.

An error recognition module 302 is operable to monitor the IVR session conducted between the IVR response unit 122 and one or more customers operating telecommunication devices 174/180. The error recognition module 302 can use one or more methods to determine if the customer is having trouble with the IVR script. In another embodiment, the IVR script/IVR application has the ability to monitor the IVR session and the functions of the error recognition module 302 are incorporated into the IVR script. In one embodiment, if the user presents one or more incorrect answers to responses in the IVR script, the error recognition module 302 can determine that the customer is having difficulty with the IVR script. If the customer is having trouble with the IVR script, the error recognition module 302 can signal the suspension module 304 that such difficulty has occurred. In embodiments, the error recognition module 302 may determine difficulty with the IVR script based on one or more predetermined rules stored in the rules database 310.

The suspension module 304 is operable to suspend the IVR script. Thus, the suspension module, upon receiving a signal from the error recognition module 302, can send a signal to the IVR unit 122 to suspend the IVR script. Further, the suspension module 304 can also receive inputs or commands from an agent communication device 134/138. Thus, the agent communication device 134/138 can control the function of the suspension module 304. The agent can reinitiate the IVR script, continue the suspension, cancel the IVR session or do one or more other tasks by interacting with the suspension module 304.

Figure 6:
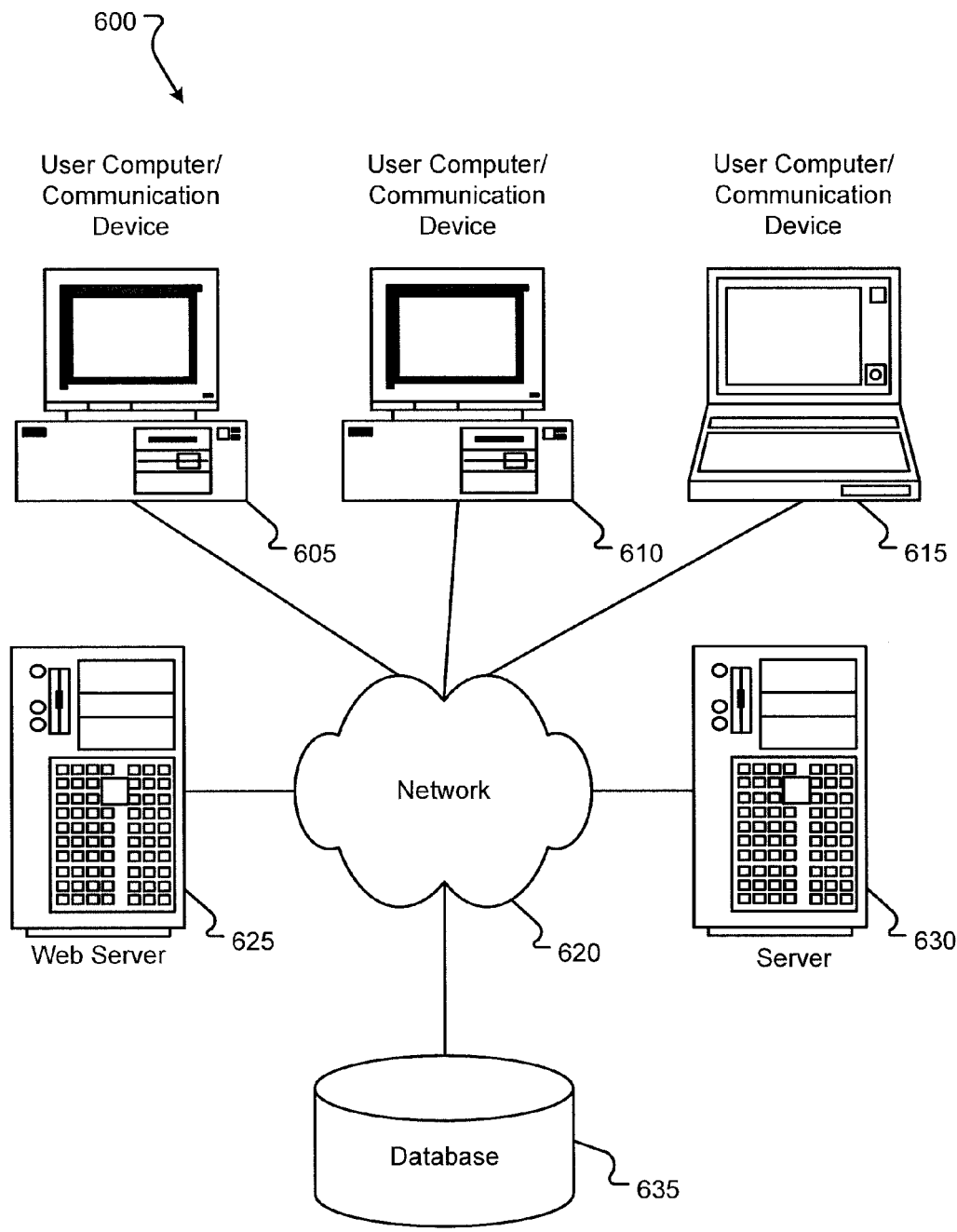
FIG. 6 is a block diagram of an embodiment of a computer system environment in which the systems and methods may be executed.
Figure 7:
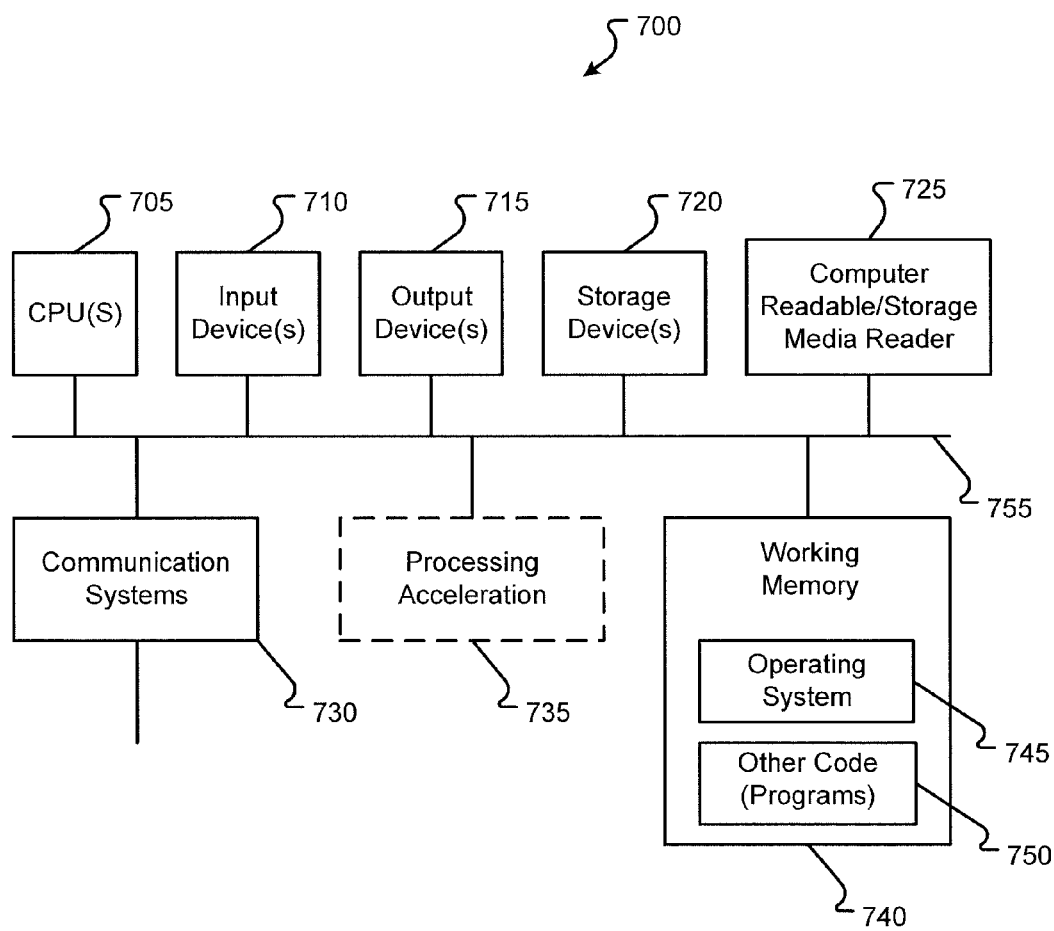
FIG. 7 is a block diagram of a computer system in which the systems and methods may be executed.

An IVR database 306 can be any database as described in conjunction with FIGS. 6 and 7. In embodiments, the IVR database 306 includes information about one or more communication sessions between the customer and the IVR unit 122. This information can include customer information, IVR script information, information about responses to the current IVR script, questions asked during the IVR session, etc. Data stored within the IVR database 306 can be as described in conjunction with FIG. 4.

The IP transfer module 312 is operable to transfer information to the agent communication device 134/138. In embodiments, the IP transfer module 312 can obtain information from the IVR database 306 or other data sources to send to the agent communication device 134/138. This information can include IVR script information, information about the current IVR session, information about the customer, or other information needed or requested by the agent communication device 134/138 to conduct or conference with the customer about the IVR script.

The rules database 310 is operable to store information about how to determine when an agent should assist with an IVR script. These rules may be predetermined by the user or standard for all Agent IVR Conference Systems 232. Example rules can include if the user incorrectly answers a question two times, answers two sequential questions incorrectly, etc. then assistance is needed; if a user presses "0", to obtain human assistance, two or more time in response to a question, then assistance is needed; or if a user goes back or forward through one or more questions, then assistance is needed. More rules are possible and contemplated. The rules can be categorized based on the customer, context of the assistance, or other data to better determine when assistance is required. Thus, the rules database 310 may provide the error recognition module 302 with some or all of the rules depending on the call.

A conference call module 308 is operable to conference the customer telecommunication device 170/180 with the IVR unit 122 and the agent communication device 134/138. Thus, the conference call module 308 can bring the three different entities into one conference call and allow the agent to direct the customer actions with respect to the IVR script. The conference call module 308 may also conference in other agents or customers as needed. The conference call module 308 begins a conference upon direction of the error recognition module 302 or suspension module 304 when it is determined that a conference is needed because a customer is having trouble with an IVR script. The conference call module 308 is operable to communicate with the contact queue 216, the agent and contact selector 220, and one or more queues 208/212 to initiate and conduct a conference call.

Figure 4:
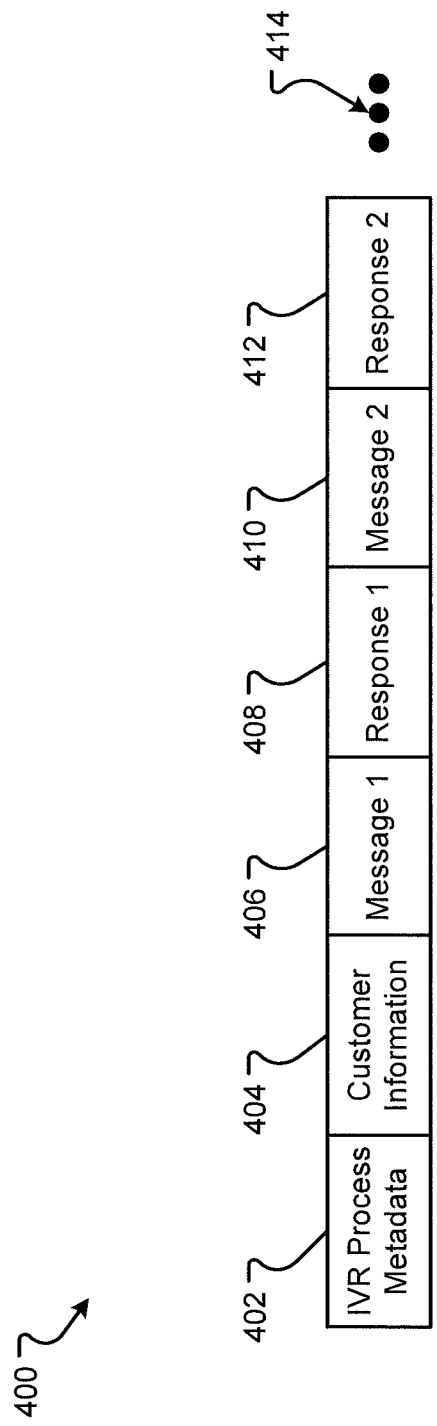
FIG. 4 is a block diagram of an embodiment of a data structure for evaluating a caller for hiring into the contact center.

An embodiment of a data structure 400 that may be received, sent, or stored while determining whether a caller requires assistance with an IVR session is shown in FIG. 4. The one or more data structures described in conjunction with FIG. 4 can be any type of data structure including an object, a field, or other data structure in a relational database, a flat file database, etc. Here, each field within the data structure 400 is described as a portion of the data structure 400. However, it should be understood by one skilled in the art, the portion can be a field, attribute, or other data structure according to the type of database used. The portions may include data associated with IVR process metadata 402, customer information 404, a first message 406, a first response 408, a second message 410, and a second response 412. There may be more or fewer items of data in the data structure 400 as represented by ellipses 414. Further, each IVR session may include a separate data structure 400 that may be stored in the IVR database 306. However, only a single data structure 400 is shown in FIG. 4 in order for simpler discussion and description of the data structure.

The IVR process metadata 402 can describe one or more items of information about the current IVR session or IVR script. For example, the IVR process metadata 402 can include a unique ID assigned to the IVR session, can include an identifier associated with the IVR script being executed during the IVR session, or other information that may be pertinent to the agent when the agent is trying to help the customer with the IVR session. The IVR process metadata 402 may be collected from the IVR unit 122 and stored in the IVR process metadata portion 402. The agent may access the IVR process metadata 402 on an agent communication device 134/138 during the conference IVR session.

Customer information 404 can include one or more items of information about the customer currently engaged in the IVR session. The customer information 404 can include the customer's name, address, phone number, previous calls, or other information stored by the server 110. Customer information 404 may be taken before the IVR session, obtained during the IVR session, or stored during previous calls and retrieved by the Agent IVR Conference System 232.

The data structure 400 may also store one or more messages and responses that are part of the IVR script. For example, the IVR session may have requested information in a first message 406 and a second message 410. The customer may have given information in response 408 and response 412. By having the message and responses from the IVR script stored in the data structure 400, the agent can deduce where the customer may have entered incorrect information or had trouble with the IVR script. Thus, the entire message/response session with the IVR script may be stored in one or more portions of the data structure 400.

Figure 5:
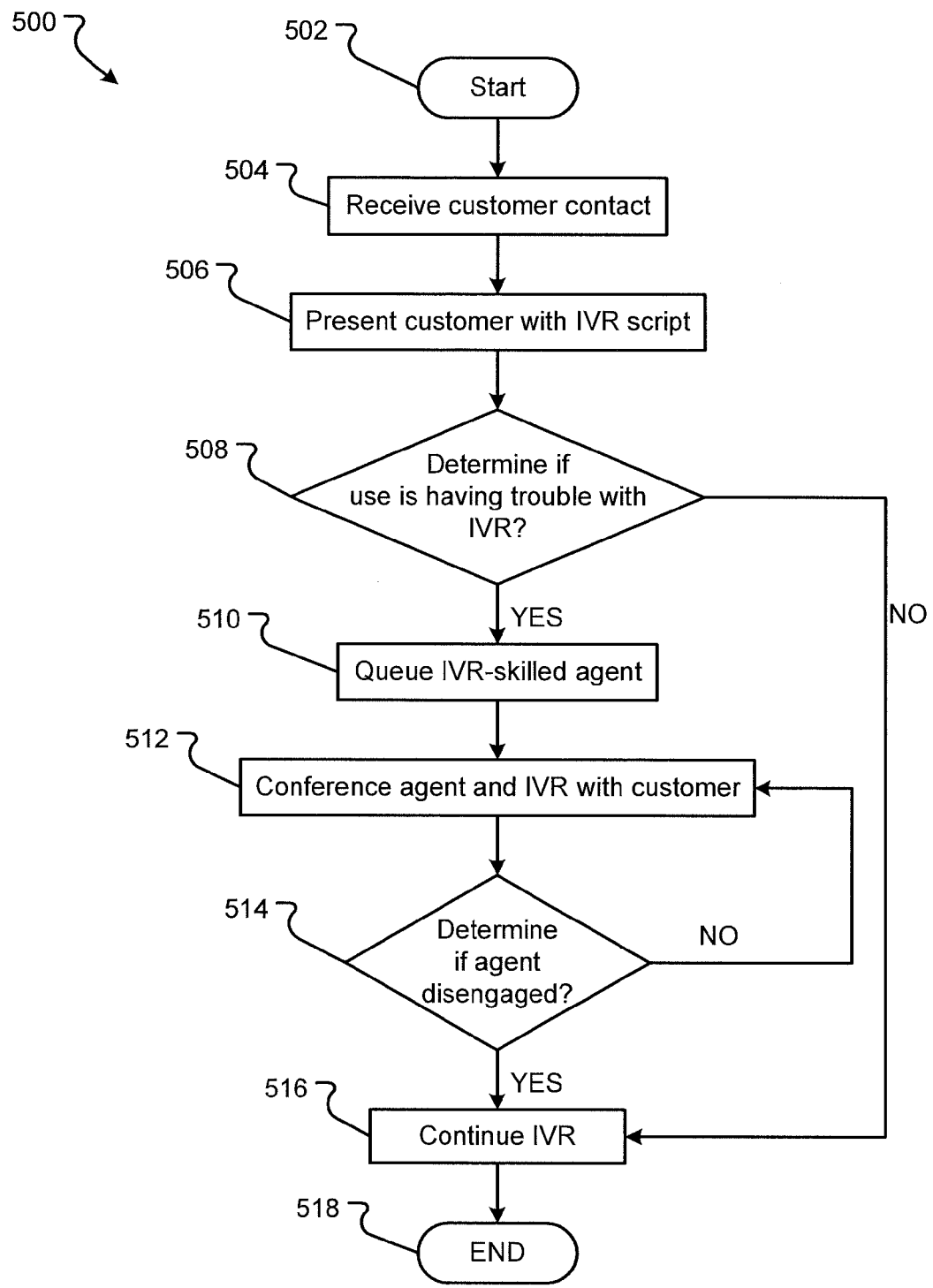
FIG. 5 is a flow diagram of an embodiment of a process for rating a caller and storing a personal profile of the caller that includes the rating.

An embodiment of a method for conducting an agent conference IVR session is shown in FIG. 5. Generally, the method 500 begins with a start operation 502 and terminates with an end operation 518. While a general order for the steps of the method 500 is shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, software, data structures, etc. described in conjunction with FIGS. 1-4.

The server 110 receives a customer contact from a telecommunication device 174/180, in step 504. The customer contact can be a contact of any type of media but, in embodiments described hereinafter, is described as telephone call received through one or more networks 162/154, possibly a switch 130, a bus 142, a gateway 178,158, or one or more other devices. The customer contact can be directed from the server 110 into a contact queue 216.

The server 110 may then determine that the customer contact is suitable for sending to an IVR unit 122. The server 110 may then send the contact to the IVR unit 122 to have the IVR unit 122 interact with the customer. The IVR unit 122 can then present the customer with an IVR script, in step 506. The IVR script may include one or more questions and require interactive responses from the customer. The customer may be able to enter information through voice responses or using a key pad. This information may be recorded by the IVR unit 122 and presented to the server 110.

The server 110 may receive the information from the IVR unit 122 and provide it to an agent IVR conference system 232. The error recognition module 302 of the agent IVR conference system 232 can analyze the information received from the IVR response unit 122, to determine if the user is having trouble with the IVR script, in step 508. Further, the agent IVR conference system 232 can store the received information in the IVR database 306, in a data structure 400. As the customer is interacting with the IVR unit 122 the error recognition module 302 can analyze the information to determine if the user is having trouble with the IVR script. For example, the error recognition module 302 can retrieve one or more rules from the rules database 310 and apply the rule(s) to the IVR session. For example, the error recognition module 302 can determine if the customer has entered one or more incorrect answers during the IVR script. If a customer has sequentially entered two or more incorrect answers, the customer may be having difficulty. In other examples, the error recognition module 302 can recognize the user has requested an operator or some other help during the IVR session. If the error recognition module determines that the user is having trouble with the IVR, step 508 proceeds "YES" to step 510. If the error recognition module determines that the user is not having trouble with the IVR, step 508 proceeds "NO" to step 516 to continue the IVR while the error recognition module 302 continues to monitor the session.

A suspension module 304 can then receive a signal from the error recognition module 302; the signal can indicate that the user is having trouble with the IVR script. The signal directs the suspension module 304 to suspend the IVR script. The suspension module 304 may then send a signal to the IVR unit 122 to suspend the script. Further, the error recognition module 302 can send a signal to the agent and contact selector 220 to queue an agent into an agent queue 212 associated with IVR assistance. The agent, in embodiments, has skills in directing customers through IVR scripts. Further, the error recognition module 302 directs the agent and contact selector to queue the contact into a queue 208 to be placed in the conference. The error recognition module 302 then instructs the conference call module 308 to conference in the agent, customer, and IVR session into a conference call.

The agent contact selector 220 queues an IVR skilled agent into a skill queue 212, in step 510. The agent contact selector 220 may then inform the customer, in the queue 208, that the agent is going to be included in the contact. In embodiments, one of the skill queues 212 is related to IVR systems. Further, one of the contact queues 208 is associated with help with the IVR session. When the agent is available, the agent contact selector 220 can inform the agent IVR conference system 232 to conduct the conference.

Upon receiving a signal that the agent is available, the conference call module 308 can create a conference call between the customer telecommunication device 174/180, the IVR unit 122, and the agent communication device 134/138, in step 512. The conference call includes each of the three entities and allows the agent to communicate with the customer about the IVR script. Further, the agent is operable to reinitiate the IVR script by instructing the suspension module 304 to start the IVR script, may continue to suspend the IVR script, may provide a different IVR script, may change or instruct the IVR script to change its execution or behavior, or do other actions to help the customer with their needs in providing information to the server 110 through the IVR session.

At some point thereinafter, the agent can disengage from the conference. The agent may disengage if the customer is able to then perform the rest of the IVR script and is allowed to complete the IVR script on their own, or may disengage if the agent handles the customer's call rather than continue with the IVR script. In embodiments, the method 500 shows the continuation of the method 500 if the agent disengages because the customer continues with the IVR script. Thus, the conference call module 308 can determine if the agents disengaged, in step 514. If the agent is disengaged, step 514 proceeds "YES" to step 516. If the agent is not disengaged, step 514 proceeds "NO" back to step 512 where the conference continues with the agent, the IVR unit 122, and the customer.

In step 516, the customer continues with the IVR script. Thus, the customer is able to answer further questions and respond to the questions until the IVR script is completed, a new IVR script is started, or the customer needs help again. The information about the continued IVR session continues to be stored in the data structure 400, and the information continues to be sent from the IVR unit 122 to the agent IVR conference system 232. The customer may need help again in which case the method 500 may start over at step 508.

The computers, computer systems, servers, devices, and/or components that are described herein and that may execute the processes described herein may be as described in conjunction with FIGS. 6 and 7. FIG. 6 illustrates a block diagram of a computing environment 600. The system 600 includes one or more computers 605, 610, and 615. The computers 605, 610, and 615 may be general purpose personal computers (including, merely by way of example, personal computers and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computers 605, 610, 615 may also have any of a variety of applications, including for example, database client and/or server applications, and web browser applications. Alternatively, the computers 605, 610, and 615 may be any other electronic device, such as a thin-client computer, mobile telephone, mobile device, Internet-enabled mobile telephone, and/or personal digital assistant, capable of communicating via a network (e.g., the network 620 described below) and/or displaying and navigating web pages or other types of electronic data. Although the exemplary system 600 is shown with three computers, any number of computers may be supported.

System 600 further includes a network 620. The network 620 may can be any type of network familiar to those skilled in the art that can support data communications using any of a variety of commercially-available protocols, including without limitation TCP/IP, SNA, IPX, AppleTalk, and the like. Merely by way of example, the network 620 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth® protocol known in the art, and/or any other wireless protocol); and/or any combination of these and/or other networks.

The system 600 may also include one or more server computers 625 and 630. The server computers 625 and/or 630 can represent the customer service server 102. One server may be a web server 625, which may be used to process requests for web pages or other electronic documents from user computers 605, 610, and 620. The web server can be running an operating system including any of those discussed above, as well as any commercially-available server operating systems. The web server 625 can also run a variety of server applications, including HTTP servers, FTP servers, CGI servers, database servers, Java servers, and the like. In some instances, the web server 625 may publish operations available operations as one or more web services.

The system 600 may also include one or more file and or/application servers 630, which can, in addition to an operating system, include one or more applications accessible by a client running on one or more of the user computers 605, 610, 615. The server(s) 630 may be one or more general purpose computers capable of executing programs or scripts in response to the user computers 605, 610 and 615. As one example, the server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The application server(s) 630 may also include database servers, including without limitation those commercially available from Oracle, Microsoft, Sybase™, IBM™ and the like, which can process requests from database clients running on a user computer 605.

The web pages created by the web application server 630 may be forwarded to a user computer 605 via a web server 625. Similarly, the web server 625 may be able to receive web page requests, web services invocations, and/or input data from a user computer 605 and can forward the web page requests and/or input data to the web application server 630. In further embodiments, the server 630 may function as a file server. Although for ease of description, FIG. 6 illustrates a separate web server 625 and file/application server 630, those skilled in the art will recognize that the functions described with respect to servers 625, 630 may be performed by a single server and/or a plurality of specialized servers, depending on implementation-specific needs and parameters.

The system 600 may also include a database 635. The database 635 may reside in a variety of locations. By way of example, database 635 may reside on a storage medium local to (and/or resident in) one or more of the computers 605, 610, 615, 625, 630. Alternatively, it may be remote from any or all of the computers 605, 610, 615, 625, 630, and in communication (e.g., via the network 620) with one or more of these.

In a particular set of embodiments, the database 635 may reside in a storage-area network ("SAN") familiar to those skilled in the art. Similarly, any necessary files for performing the functions attributed to the computers 605, 610, 615, 625, 630 may be stored locally on the respective computer and/or remotely, as appropriate. In one set of embodiments, the database 635 may be a relational database, such as Oracle 10i®, that is adapted to store, update, and retrieve data in response to SQL-formatted commands.

FIG. 7 illustrates one embodiment of a computer system 700 upon which the test system may be deployed or executed. The computer system 700 is shown comprising hardware elements that may be electrically coupled via a bus 755. The hardware elements may include one or more central processing units (CPUs) 705; one or more input devices 710 (e.g., a mouse, a keyboard, etc.); and one or more output devices 715 (e.g., a display device, a printer, etc.). The computer system 700 may also include one or more storage devices 720. By way of example, storage device(s) 720 may be disk drives, optical storage devices, solid-state storage devices, such as a random access memory ("RAM") and/or a read-only memory ("ROM"), which can be programmable, flash-updateable, and/or the like.

The computer system 700 may additionally include a computer-readable storage media reader 725; a communications system 730 (e.g., a modem, a network card (wireless or wired), an infra-red communication device, etc.); and working memory 740, which may include RAM and ROM devices as described above. In some embodiments, the computer system 700 may also include a processing acceleration unit 735, which can include a DSP, a special-purpose processor and/or the like The computer-readable storage media reader 725 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 730 may permit data to be exchanged with the network 720 and/or any other computer described above with respect to the system 700. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices, and/or other machine readable mediums for storing information.

The computer system 700 may also comprise software elements, shown as being currently located within a working memory 740, including an operating system 745 and/or other code 750, such as program code implementing the components and software described herein. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of computer-readable or machine-executable instructions, which may be used to cause a machine, such as a general-purpose or special-purpose processor or logic circuits programmed with the instructions to perform the methods. These computer-readable or machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of computer-readable or machine-readable mediums suitable for storing electronic instructions. Alternatively, the methods may be performed by a combination of hardware and software.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method for assisting a person with an interactive voice response (IVR) session, the method comprising:
    a contact center server receiving a voice call from a person;
    the contact center server queuing the voice call in a contact center queue;
    an IVR unit presenting the person with an IVR script in an IVR session;

determining that the person is having difficulty with the IVR script; and if the person is having difficulty with the IVR script, an agent IVR conference system conferencing the person with a human agent and the IVR unit, wherein the human agent directs the person in interacting with the IVR script during the conference between the person, the human agent, and the IVR unit.

2. The method as defined in claim 1, wherein the IVR script includes rules to determine that the person is having difficulty executing the IVR script.

3. The method as defined in claim 1, wherein the human agent does not interact with the IVR script.

4. The method as defined in claim 1, further comprising:
in response to determining that the person is having difficulty with the IVR script, the contact center server queuing the human agent into an agent queue associated with IVR assistance; and
in response to determining that the person is not having difficulty with the IVR script, queuing the voice call into a skill queue.

5. The method as defined in claim 4, further comprising when the human agent in the agent queue associated with IVR assistance is available, conferencing the human agent from the agent queue with the voice call in the skill queue.

6. The method as defined in claim 1, further comprising:
a conference call module determining if the human agent disengages from the conference;
if the human agent disengages from the conference, the IVR unit continuing the IVR script with the person; and
if the human agent does not disengage from the conference, the conference call module continuing the conference.

7. The method as defined in claim 6, wherein determining that the person is having difficulty with the IVR script comprises an error recognition module applying one or more rules to the IVR session.

8. The method as defined in claim 1, further comprising: in response to conferencing the person with the human agent and the IVR unit, an IP transfer module presenting the human agent with data associated with the IVR session.

9. The method as defined in claim 8, wherein the data associated with the IVR session includes one or more of IVR process metadata, customer information, at least one message, and at least one response to the at least one message.

10. The method as defined in claim 9, wherein each IVR session conducted by the IVR unit has a data structure associated with the IVR session.

11. A contact center server comprising:
a memory operable to store one or more computer executable instructions;
a processor in communication with the memory, the processor operable to execute the one or more computer executable instructions, wherein executing the one or more computer executable instructions causes the processor to execute modules adapted to assist a person with an interactive voice response (IVR) session, the modules comprising:
a contact center queue operable to queue a received voice call;
an IVR unit operable to present the person with an IVR script in an IVR session;
an error recognition module operable to determine that the person is having difficulty with the IVR script; and
if the person is having difficulty with the IVR script, a conference call module operable to conference the person with a human agent and the IVR unit, wherein the human agent directs the person in interacting with the IVR script during the conference between the person, the human agent, and the IVR unit.

12. The contact center server as defined in claim 11, further comprising, if the person is having difficulty with the IVR script, a suspension module operable to suspend the IVR script.

13. The contact center server as defined in claim 12, further comprising an IVR database operable to store information, the information comprising at least two of:
IVR process metadata;
customer information;
a message associated with the IVR script; and
a response provided to the IVR unit in reply to the message.

14. The contact center server as defined in claim 13, further comprising an IP transfer module operable to send at least a portion of the information stored in the IVR database to an agent communication device, wherein the agent communication device is associated with the human agent in the conference.

15. The contact center server as defined in claim 11, further comprising a rules database operable to store one or more rules that instruct the error recognition module how to determine if the person is having difficulty with the IVR script.

16. A non-transitory computer readable medium having stored thereon computer-executable instructions, when executed by a processor cause the processor to execute a method for assisting a person with an interactive voice response (IVR) session, the computer-executable instructions comprising:
instructions to receive a voice call from a person;
instructions to queue the voice call in a contact center queue;
instructions to connect the voice call in the contact center queue with an IVR unit to conduct an IVR session;
instructions to present the person with an IVR script during the IVR session;
instructions to monitor the IVR session;
instructions to determining that the person is having difficulty with the IVR script;
if the person is not having difficulty with the IVR script, instructions to continue to monitor the IVR session;
if the person is having difficulty with the IVR script, instructions to conference the person with a human agent and the IVR unit; and
instructions to receive an IVR response from the person during the conference, wherein the human agent directs the person to enter the IVR response during the conference between the person, the human agent, and the IVR unit.

17. The computer readable medium as defined in claim 16, further comprising instructions to compare the IVR session with one or more rules stored in a rules database.

18. The computer readable medium as defined in claim 17, wherein a first rule includes the person providing at least two incorrect answers.

19. The computer readable medium as defined in claim 18, wherein a second rule includes the person providing two incorrect answers that are to a same question.

20. The computer readable medium as defined in claim 18, wherein a second rule includes the person providing two incorrect answers to two sequential questions.

* * * * *